US009754557B2

(12) United States Patent
Lim

(10) Patent No.: US 9,754,557 B2
(45) Date of Patent: Sep. 5, 2017

(54) SOURCE DEVICE, SINK DEVICE, WIRELESS LOCAL AREA NETWORK SYSTEM, METHOD FOR CONTROLLING THE SINK DEVICE, TERMINAL DEVICE, AND USER INTERFACE

(71) Applicant: Pantech Inc., Seoul (KR)

(72) Inventor: Oh Seob Lim, Seoul (KR)

(73) Assignee: Pantech Inc., Seoul (KR)

( * ) Notice: Subject to any disclaimer, the term of this patent is extended or adjusted under 35 U.S.C. 154(b) by 986 days.

(21) Appl. No.: 14/044,283

(22) Filed: Oct. 2, 2013

(65) Prior Publication Data

US 2014/0176396 A1 Jun. 26, 2014

(30) Foreign Application Priority Data

Dec. 20, 2012 (KR) ........................ 10-2012-0149582

(51) Int. Cl.
| | |
|---|---|
| *G06F 15/16* | (2006.01) |
| *G09G 5/14* | (2006.01) |
| *G06F 3/14* | (2006.01) |

(52) U.S. Cl.
CPC ............. *G09G 5/14* (2013.01); *G06F 3/1454* (2013.01); *G09G 2340/10* (2013.01); *G09G 2340/12* (2013.01); *G09G 2354/00* (2013.01); *G09G 2370/16* (2013.01)

(58) Field of Classification Search
CPC ........ G06F 3/14; G06F 3/1423; G06F 3/1454; G09G 2340/12; G09G 2370/16
See application file for complete search history.

(56) References Cited

U.S. PATENT DOCUMENTS

| | | | | |
|---|---|---|---|---|
| 2006/0150224 | A1* | 7/2006 | Kamariotis | ...... H04N 21/21805 725/89 |
| 2007/0005795 | A1* | 1/2007 | Gonzalez | .......... G06F 17/30017 709/232 |
| 2009/0238405 | A1* | 9/2009 | Buznach | ................. A63F 13/12 382/103 |
| 2012/0182203 | A1* | 7/2012 | Yoshikawa | ........... G06F 3/1423 345/1.3 |
| 2015/0172404 | A1* | 6/2015 | Sathish | ................ H04W 12/06 709/217 |

* cited by examiner

*Primary Examiner* — David Lazaro
(74) *Attorney, Agent, or Firm* — H.C. Park & Associates, PLC

(57) ABSTRACT

A source device includes an event processing unit processing an event which occurs in a remote sink device that communicates through a WLAN, a control unit setting an event management area of the sink device, and a determination unit determining whether the event transferred from the sink device has occurred in the event management area and outputting the event to the event processing unit when the event has occurred in the event management area.

20 Claims, 17 Drawing Sheets

SOURCE DEVICE, SINK DEVICE, WIRELESS LOCAL AREA NETWORK SYSTEM, METHOD FOR CONTROLLING THE SINK DEVICE, TERMINAL DEVICE, AND USER INTERFACE

CROSS-REFERENCE TO RELATED APPLICATION

This application claims priority to and benefit under 35 U.S.C. §119 of Korean Patent Application No. 10-2012-0149582, filed on Dec. 20, 2012, the contents of which in its entirety are herein incorporated by reference.

BACKGROUND

Field

Exemplary embodiments relate to a source device, a sink device, a WLAN system, a method for controlling the sink device, a terminal device, and a user interface, and more particularly to a source device that can perform WLAN based display, a sink device, a WLAN system, a method for controlling the sink device, a terminal device, and a user interface provided in the terminal device.

Description of the Background

Recently, a technology using a wireless communication technology has been widely used in industry. Various services, such as, voice communication, data transmission, and the Internet, have been provided based on a wireless network, and a representative wireless technology based on such a wireless network may be WiBro (Wireless Broadband internet) and Wi-Fi (Wireless Fidelity; wireless local area network (WLAN) products that are based on the Institute of Electrical and Electronics Engineers' (IEEE) 802.11 standards).

Wi-Fi, which is one of near field wireless communication technology having IEEE 802.11 as draft standards, is a WLAN (Wireless Local Area Network) technology that grafts a wireless technology on Hi-Fi (High Fidelity) to achieve high performance wireless communication. The WLAN technology constructs a network using radio waves or light without using wires.

Using such a Wi-Fi technology, it becomes possible to wirelessly connect to a portable computer, such as, a notebook computer, and to use the portable computer in the neighborhood of the portable computer. Further, using the Wi-Fi technology, a plurality of PCs are connected to each other to transfer large files, graphics, video and audio. Wi-Fi wireless to Ethernet can be used anywhere including home and office within a radius of 500 m.

Further, with the recent advances in smart phones and portable computers users can use the smart phones together with their PCs and can perform Wi-Fi connection using smart phones and PCs.

A device that displays a screen using the Wi-Fi communication, such as, a smart is phone and a Personal Computer (PC), is called a Wi-Fi display device. In particular, a source device includes the Wi-Fi display device that provides display information, and a sink device includes the Wi-Fi display device that receives the display information.

However, since the sink device displays only the same screen as the screen that the source device displays, the use environment of the sink device is not reflected and only the screen that is provided from the source device is uniformly displayed.

Accordingly, in the case where a user inputs an event to a sink device to control the sink device, the source device includes a configuration that recognizes and executes such an event. Further, there is a need for a method for intercepting an event that violates the security policy of the source device, runs contrary to the display sharing intentions, or the capabilities of the sink device.

SUMMARY

According to exemplary embodiments, there may be provided a source device that efficiently manages a sink device.

According to exemplary embodiments, there may be provided a sink device.

According to exemplary embodiments, there may be provided a Wireless Local Area Network (WLAN) system that includes the source device or the sink device.

According to exemplary embodiments, there may be provided a method for controlling the sink device.

According to exemplary embodiments, there may be provided a terminal device that determines and processes an effective event.

According to exemplary embodiments, there may be provided a user interface that is provides a selection of an effective event occurable or management area to the terminal device.

As described above, according to the source device, the sink device, the WLAN system including the same, and the method for controlling the sink device, the event occurable or management area of the event that is received from the sink device is predetermined, and if the event occurs in the sink device, the event that has occurred in an area except for the event occurable or management area can be intercepted.

Accordingly, the event that violates the security policy of the source device or runs contrary to the display sharing intentions is intercepted, and thus the sink device can be efficiently used. Further, an unnecessary event is deleted, and thus the load of the source device can be reduced.

Further, since only the certain events are determined and processed, the load of the terminal device can be reduced. In addition, the user interface for providing the selection of the effective event occurable or management area to the terminal device can increase user convenience.

Exemplary embodiments of the present invention disclose a source device to transmit media data, the source device including: an event processing unit configured to process an event that occurs in a remote sink device communicating through a network; a control unit configured to set an event management area of the sink device; and a determination unit configured to determine whether the event transferred from the sink device has occurred in the event management area and configured to output the event to the event processing unit when the event has occurred in the event management area.

Exemplary embodiments of the present invention disclose a method utilizing a processor, the method including: processing an event that occurs in a remote sink device is communicating through a network; setting an event management area of the sink device; determining, utilizing the processor, whether the event that is transferred from the sink device has occurred in the event management area; and outputting the event to the event processing unit when the event has occurred in the event management area.

Exemplary embodiments of the present invention disclose a wireless local area network (WLAN), the WLAN including: a sink device; and a source device including: an event processing unit configured to process an event that occurs in a remote sink device communicating through a network, a control unit configured to set an event management area of the sink device, and a determination unit configured to determine whether the event transferred from the sink device has occurred in the event management area and configured to output the event to the event processing unit when the event has occurred in the event management area.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION

Figure 1:
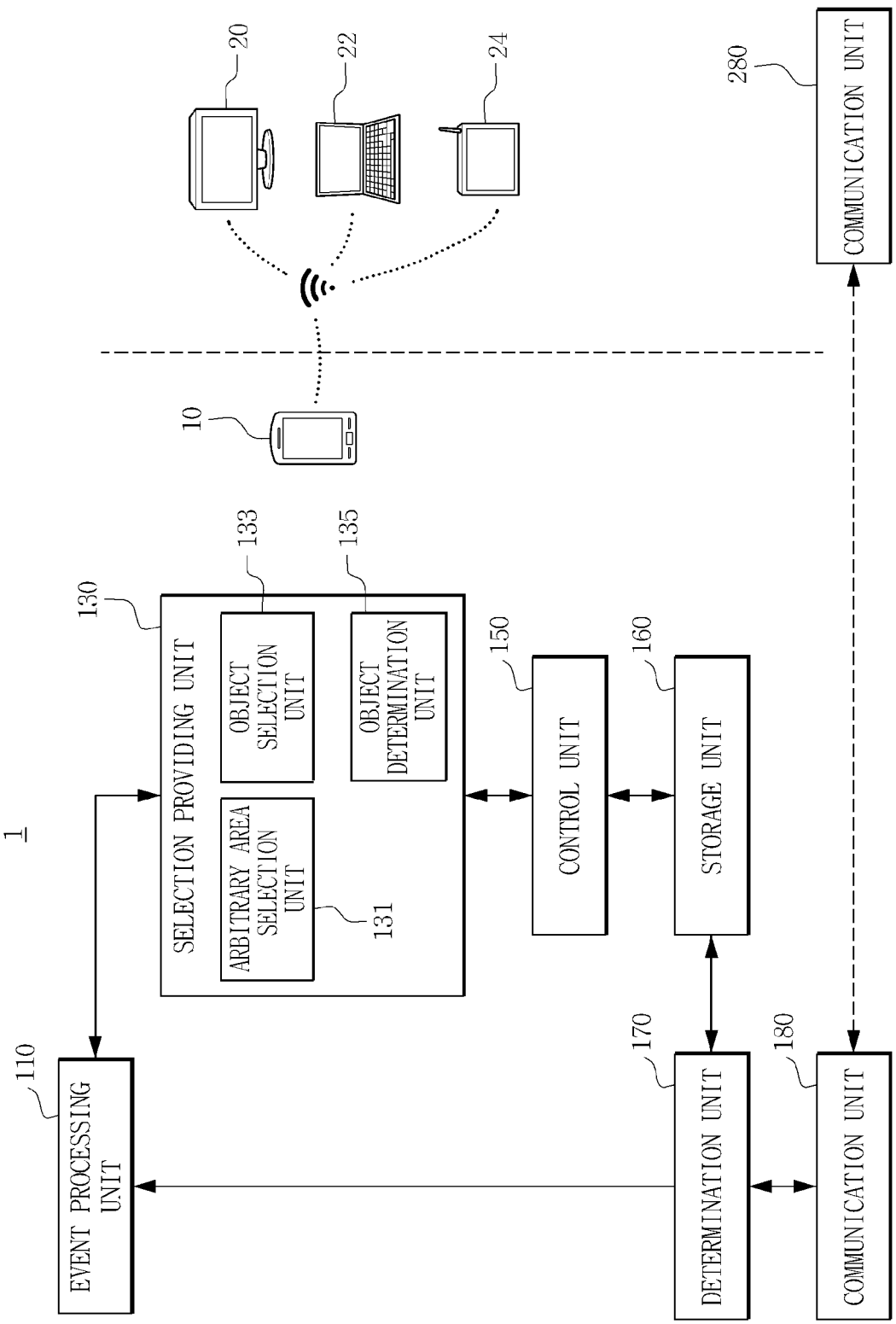
FIG. 1 is a block diagram of a WLAN system according to exemplary embodiments of the present disclosure.

The invention is described more fully hereinafter with reference to the accompanying drawings, in which exemplary embodiments of the invention are shown. This is invention may, however, be embodied in many different forms and should not be construed as limited to the embodiments set forth herein. Rather, these exemplary embodiments are provided so that this disclosure is thorough, and will fully convey the scope of the invention to those skilled in the art. It will be understood that for the purposes of this disclosure, "at least one of X, Y, and Z" can be construed as X only, Y only, Z only, or any combination of two or more items X, Y, and Z (e.g., XYZ, XZ, XYY, YZ, ZZ). Throughout the drawings and the detailed description, unless otherwise described, the same drawing reference numerals are understood to refer to the same elements, features, and structures. The relative size and depiction of these elements may be exaggerated for clarity.

The terminology used herein is for describing particular embodiments only and is not intended to be limiting of the present disclosure. As used herein, the singular forms "a," "an" and "the" are intended to include the plural forms as well, unless the context clearly indicates otherwise. Furthermore, the use of the terms a, an, etc. does not denote a limitation of quantity, but rather denotes the presence of at least one of the referenced item. The use of the terms "first," "second," and the like does not imply any particular order, but they are included to identify individual elements. Moreover, the use of the terms first, second, etc. does not denote any order or importance, but rather the terms first, second, etc. are used to distinguish one element from another. It will be further understood that the terms "comprises" and/or "comprising", or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof. Although some features may be described with respect to individual exemplary embodiments, aspects need not be limited thereto is such that features from one or more exemplary embodiments may be combinable with other features from one or more exemplary embodiments.

In addition, embodiments described in the specification are wholly hardware, and may be partially software or wholly software. In the specification, "unit", "module", "device", "system", or the like represents a computer related entity such as hardware, combination of hardware and software, or software. For example, in the specification, the unit, the module, the device, the system, or the like may be an executed process, a processor, an object, an executable file, a thread of execution, a program, and/or a computer, but are not limited thereto. For example, both of an application which is being executed in the computer and a computer may correspond to the unit, the module, the device, the system, or the like in the specification.

Hereinafter, a WLAN-based source device, a sink device, a WLAN system including the same, and a method for controlling the sink device according to exemplary embodiments of the present disclosure will be described in more detail with reference to the accompanying drawings.

Figure 4A:
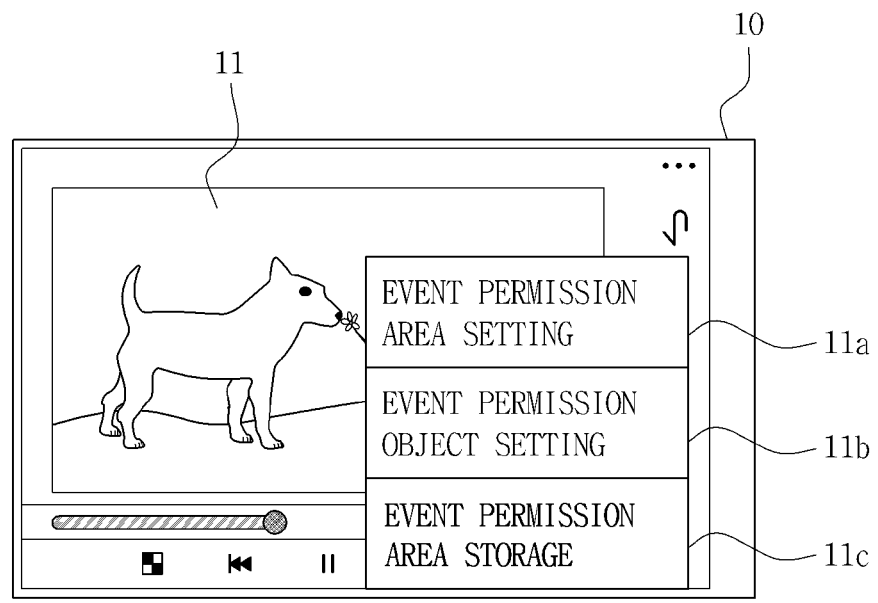
FIG. 4A and FIG. 4B are views illustrating example of screens for storing an event occurable or management area in the source device according to exemplary embodiments.
Figure 4B:
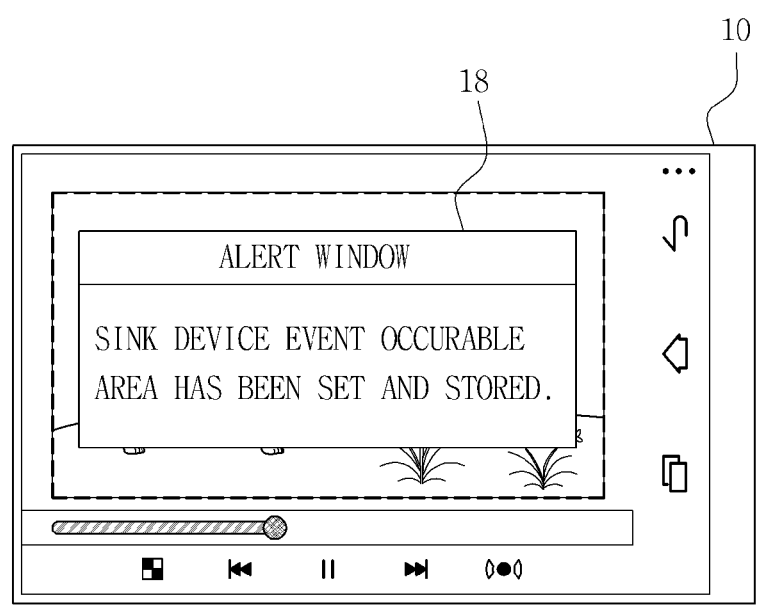
Figure 5A:
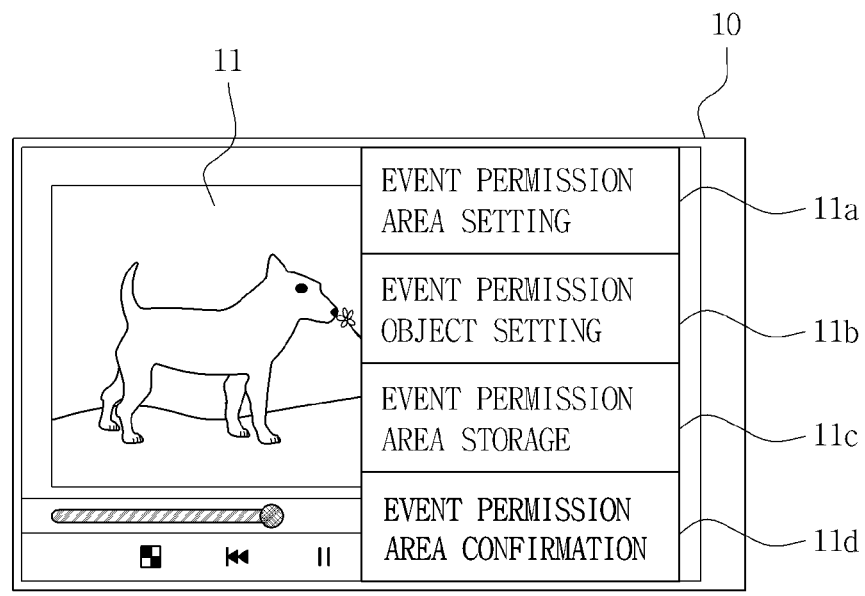
FIG. 5A and FIG. 5B are views illustrating examples of screens for confirming an event occurable or management area in the source device according to exemplary embodiments.
Figure 5B:
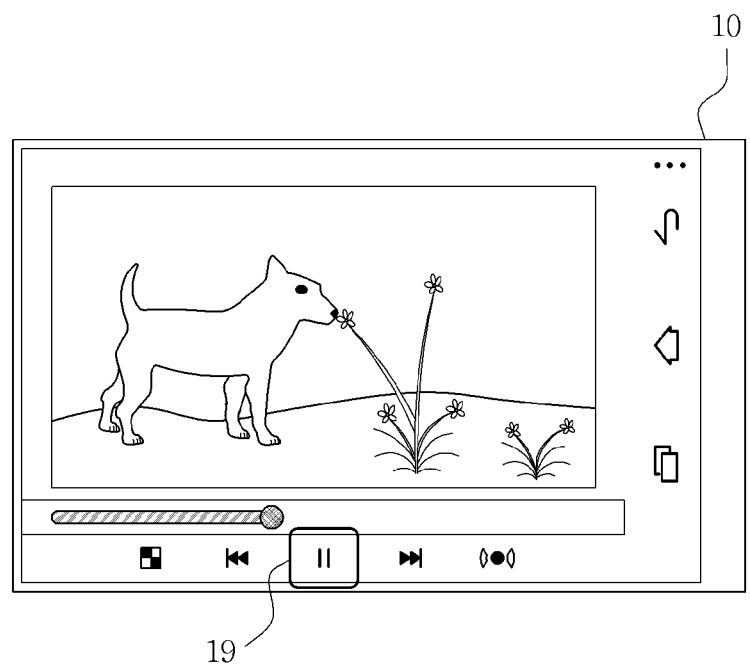
Figure 6A:
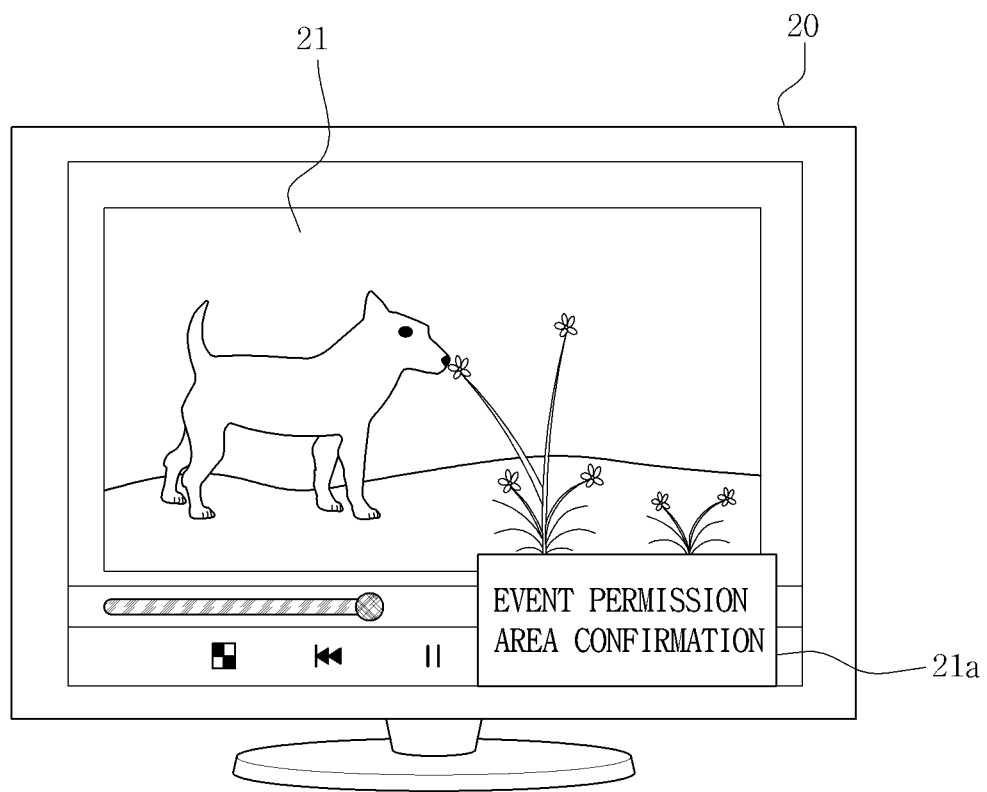
FIG. 6A and FIG. 6B are views illustrating examples of screens for confirming an event occurable or management area in the sink device according to exemplary embodiments.
Figure 6B:
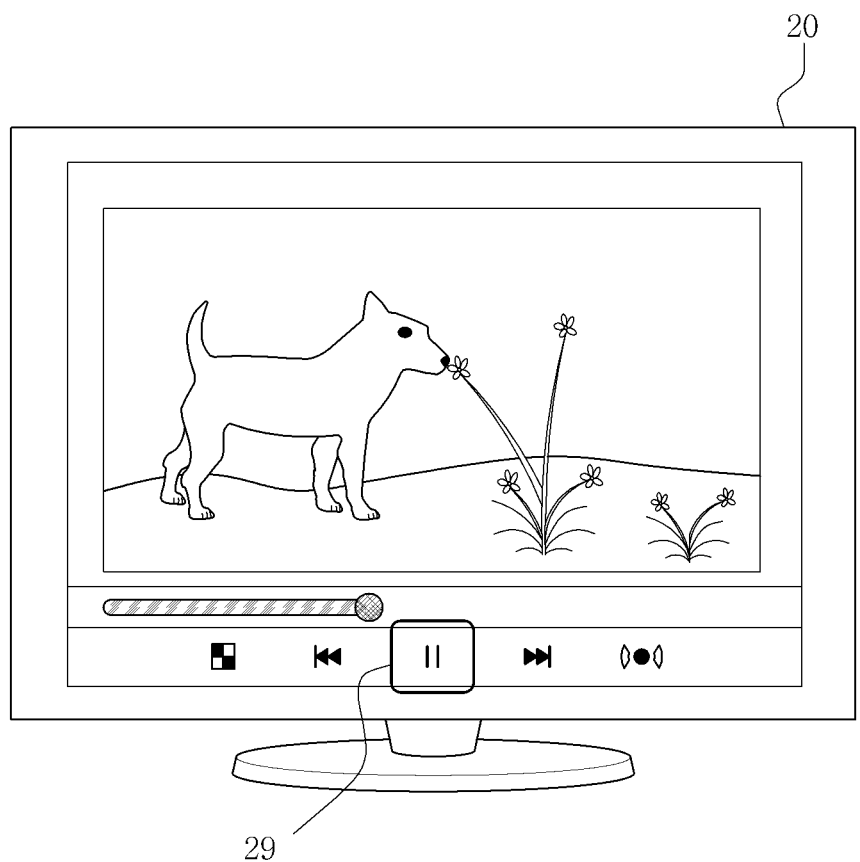

FIG. 1 is a block diagram of a WLAN system according to exemplary embodiments of the present disclosure. FIG. 2A, FIG. 2B, FIG. 2C, FIG. 2D, FIG. 3A, FIG. 3B, FIG. 3C and FIG. 3D are views illustrating examples of screens for setting an event occurable or management area in the source device according to exemplary embodiments. FIG. 4A and FIG. 4B are views illustrating example of screens for storing an event occurable or management area in the source device according to exemplary embodiments. FIG. 5A and FIG. 5B are views illustrating examples of screens for confirming an event occurable or management area in the source device according to exemplary embodiments. FIG. 6A and FIG. 6B are views illustrating examples of screens for confirming an event occurable or management area in the sink device is according to exemplary embodiments.

A screen to be described hereinafter may be a screen that is displayed on a source device 10 or a screen that is displayed on a sink device 20. However, the screen may be displayed in the same manner on the source device 10 or the sink device 20.

Referring to FIG. 1, a WLAN (Wireless Local Area Network) system 1 according to the present disclosure may include a source device 10, and at least one sink device 20, 22, and 24 that is positioned to be spaced apart from the source device 10. Hereinafter, for convenience in explanation, one sink device 20 is representatively described.

The source device 10 and the sink device 20 communicate with each other through a WLAN, and the sink device 20 receives and displays data from the source device 10. The WLAN is capable of providing Internet access in a predetermined distance using radio waves or infrared rays, and may include WLAN technology, such as, Wi-Fi. The WLAN may provide high speed or ultra-high-speed Internet access.

The source device 10 may include various types of mobile terminals, such as, a smart phone, a tablet computer, a net book, a Personal Digital Assistant (PDA), a Portable Media Player (PMP), or the like. Further, the source device 10 may execute various application programs based on the support provided by a deployed operation system (OS).

The operation systems are system programs for enabling the application programs to use hardware of a computer, and may include operating systems that can be mounted on mobile terminals, such as, ANDROID OS, IOS, WINDOWS MOBILE OS, BADA OS, SYMBIAN OS, BLACKBERRY OS, or the like.

The application programs are programs that are developed to be able to perform specific works using a computer, and may include various kinds of applications, various kinds of is multimedia content, such as, games, moving images, and photographs, or execution programs for executing the multimedia content, such as, an image viewer, a moving image player, or the like.

The sink device 20 may include all display devices that can receive and display data from the source device 10, such as, a mobile terminal, a desktop computer, a monitor, a smart TV, or the like.

In the present disclosure, if an event occurs in the sink device 20 after the sink device 20 is connected to the source device 10, the source device 10 processes the event when the event has occurred in a pre-selected event occurable or management area.

For this, the source device 10 includes an event processing unit 110, a selection providing unit 130, a control unit 150, and a determination unit 170. The source device 10 may further include a storage unit 160 and a communication unit 180.

The selection providing unit 130 provides a selection screen for selecting the event management area of the sink device 20. The selection providing unit 130 may display the selection screen so that the selection screen, on which a selection view for selecting the event management area is displayed, overlaps a current screen of the source device 10.

The event management area provides the basis of whether the event occurring in the sink device 20 is effective to transmit event requests to the sink device 20, and is an area that is pre-selected by a user. An event that occurs in an area except for the event management area, i.e., outside the event management area, is intercepted. In other words, an event that occurs outside the event management area is processed by the source device 10, may be reflected in the source device 10 and is deleted or not transmitted to the sink device 20. An event that occurs in the event management area is processed by the source device 10 to be reflected in the display of the sink device 20. In other words, events in the event management area are processed by the is source device 10 to be reflected in a display of the sink device 20 and are transmitted to the sink device 10 to be reflected in the display thereof.

In exemplary embodiments, the selection providing unit 130 may include an arbitrary area selection unit 131 providing a selection view on a selection screen where an arbitrary area can be selected.

Figure 2A:
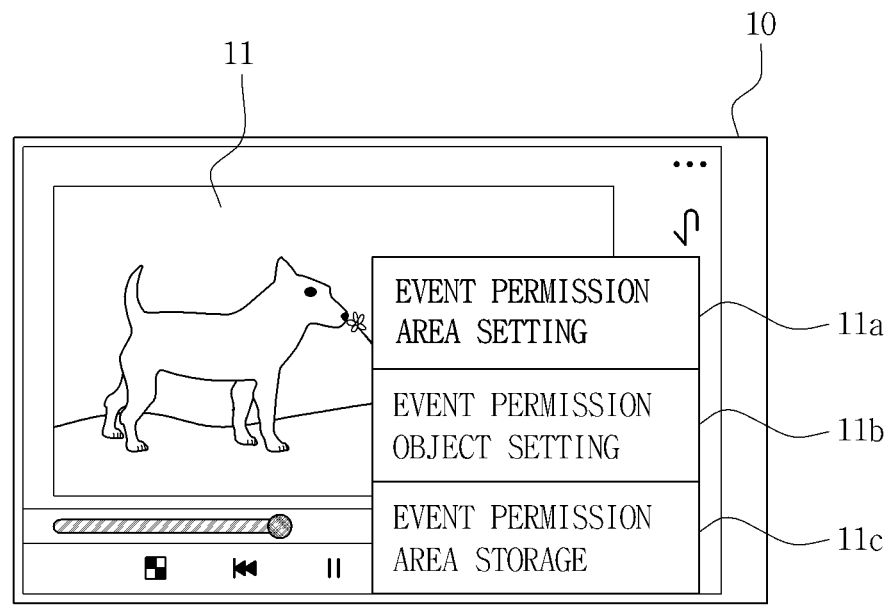
FIG. 2A, FIG. 2B, FIG. 2C, FIG. 2D, FIG. 3A, FIG. 3B, FIG. 3C and FIG. 3D are is views illustrating examples of screens for setting an event occurable or management area in the source device according to exemplary embodiments.

For example, referring to FIG. 2A, selection menus of a method for selecting an event management area may be provided on a current screen 11 that is displayed on the source device 10 in the form of a UI (User Interface). For example, menus for event permission area setting 11a, event permission object setting 11b, and event permission area storage 11c may be provided.

Figure 2B:
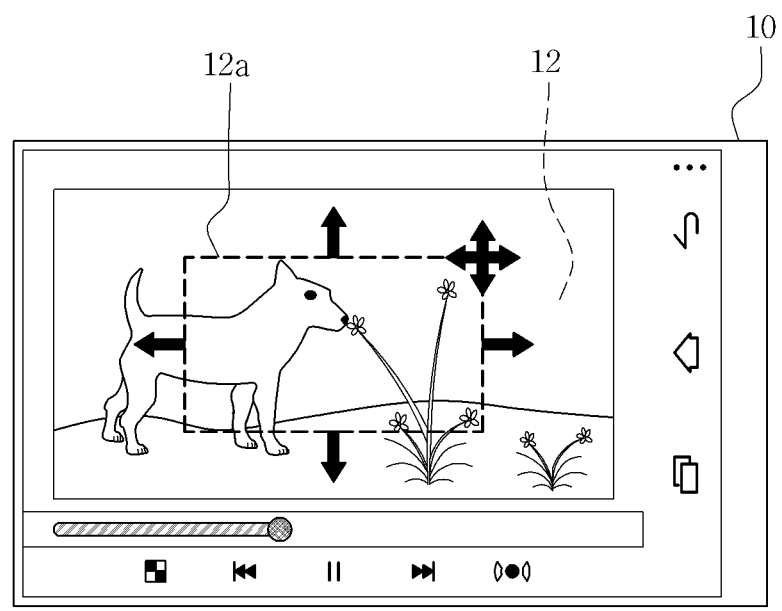

If a user selects the event permission area setting menu 11a, as illustrated in FIG. 2B, a selection screen 12, on which an arbitrary area can be selected, may be displayed. The selection screen 12 transparently overlaps the current screen 11 and only the selection view 12a may be displayed. Further, only the selection view 12a of the selection screen 12 may be displayed on the current screen 11. The selection view 12a can be moved, expanded, or contracted according to a user selection. The arrows in FIG. 2B are exemplary indicators of movements and resizing of the selection view 12a and may or may not be displayed.

Figure 2C:
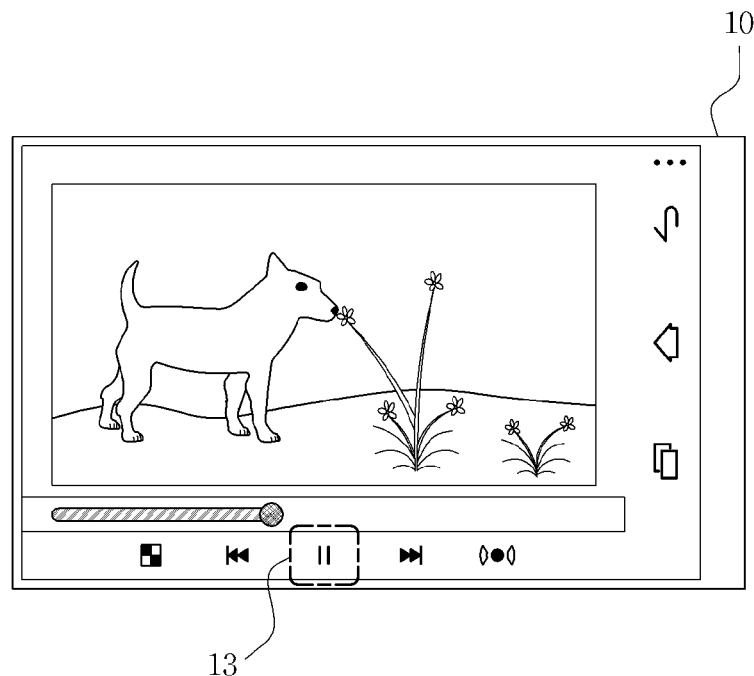
Figure 2D:
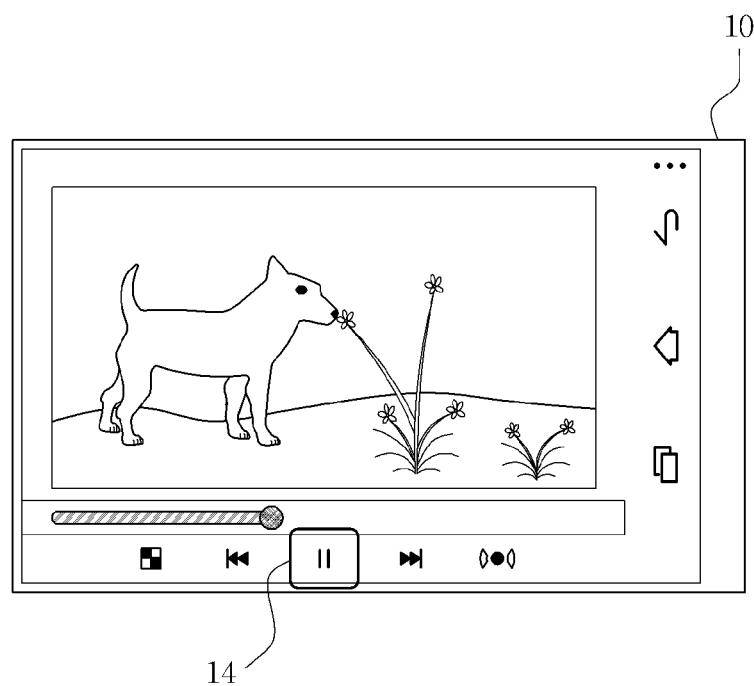

If a user selects the event permission area setting menu 11a, as illustrated in FIG. 2B, a selection screen 12, on which an arbitrary area can be selected, may be displayed. As illustrated in FIG. 2C, if the user selects an area of a pause key 13, the selected area is changed with a solid line as illustrated in FIG. 2D to indicate that the area has been set as an event management area 14. The pause key 13 can be moved, expanded, or contracted according to a user selection. Multiple event management selection areas can be set in a sink device 20, for example, the pause key 13 of FIG. 12C and the selection view 12a of FIG. 2B.

In exemplary embodiments, the selection providing unit 130 may include an object selection unit 133 and an object determination unit 135 for selecting an area that corresponds to an object on the selection screen.

The object selection unit 133 provides a selection view on the selection screen, on which the area corresponding to the object can be selected. The object may include an event listener and may provide a user interface to a specific operation that is performed according to a user's input, for example, a touch input using a touch input listener.

The touch event listener includes initiating an operation when a specific touch event occurs. For example, the touch event listener may be used to change the screen when a touch drag is performed. The touch event listener can determine a target of the touch event and a corresponding event type. The touch event listener can determine the object having the touch event listener.

The object determination unit 135 searches for an object having the touch event listener that exists on the current screen 11 and provides position and size information of the corresponding object to the object selection unit 133.

Figure 3A:
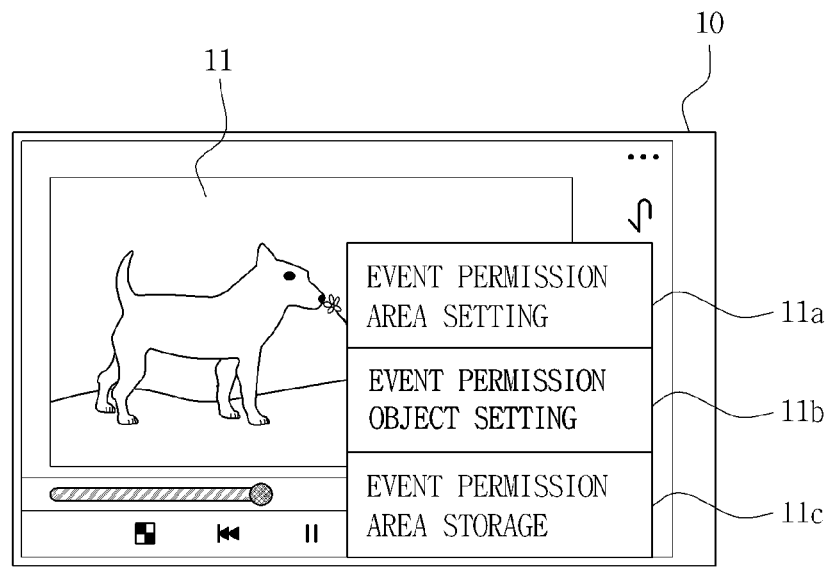
Figure 3B:
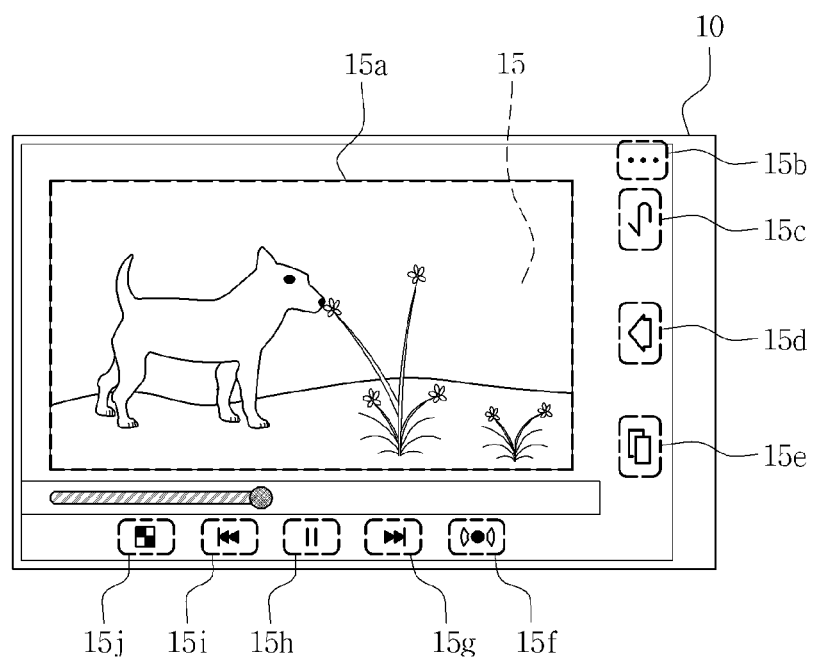

For example, referring to FIG. 3A, if the user selects the event permission object setting menu 11b among the selection menus for selecting the event management area, a selection screen 15, on which the area that corresponds to the object can be selected, may be displayed as shown in FIG. 3B. On the selection screen, selection views 15a to 15j for displaying areas that correspond to respective objects may be displayed. The selection views 15a to 15j may be objects having touch event listeners that exist on the current screen.

Figure 3C:
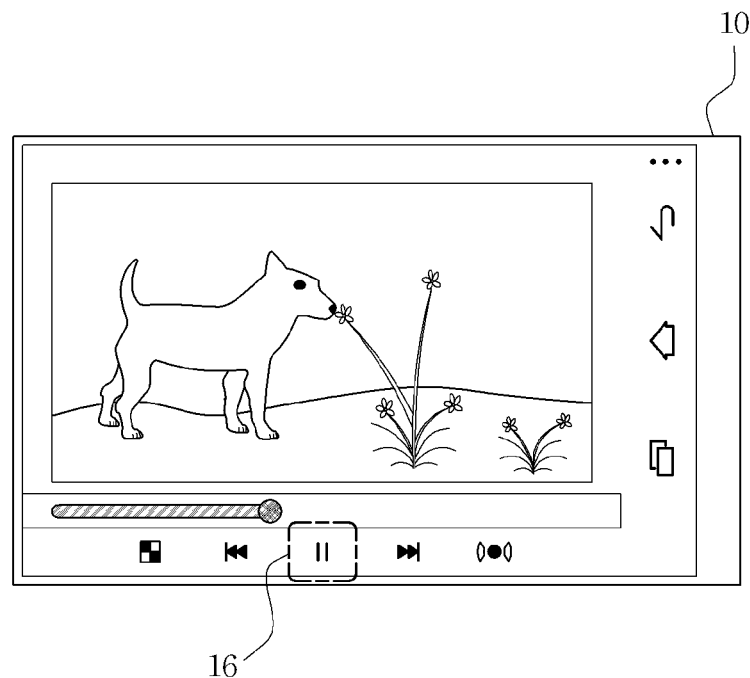
Figure 3D:
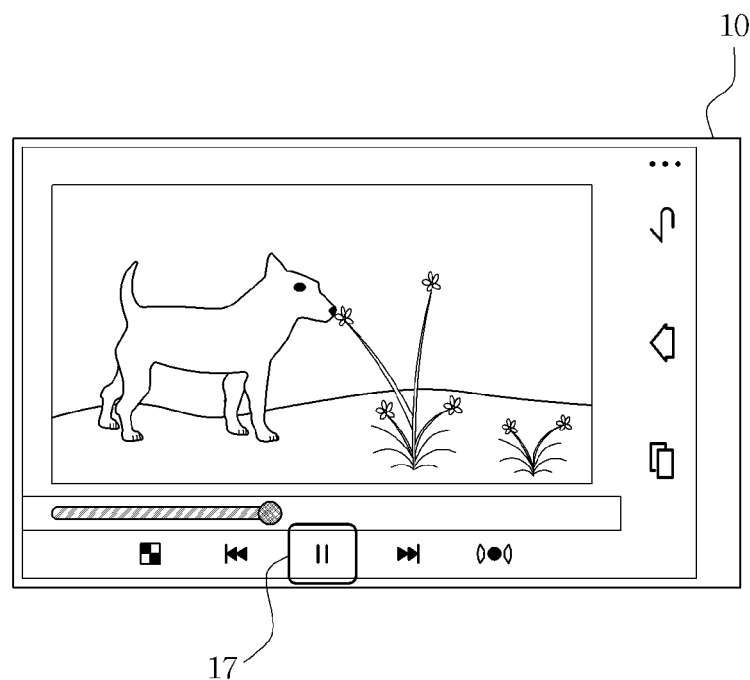

As illustrated in FIG. 3C, if the user selects the area of a pause key 16, the is selected area is changed with a solid line as illustrated in FIG. 3D to indicate that the area has been set as an event management area 17.

In exemplary embodiments, the selection providing unit 130 may include both the arbitrary area selection unit 131 and an object selection unit 133, and may perform selection of the event management area from a menu for selecting methods provided in FIG. 2A and FIG. 3A in accordance with the method selected by the user. Further, although it is described that one event management area is set, two or more event management areas can be set using the same method.

The control unit 150 sets the event management area according to the user selection provided through the selection providing unit 130. Specifically, the control unit 150 sets the area that is selected from a view configuration of activity of the current screen that is displayed on the source device 10 as the event management area. The storage unit 160 may store information on the event management area of the sink device 20 together with an application whereby the event management area is selected, activity, view information, and area coordinate information as, for example, a database.

When the event management area is added, changed, or deleted, the control unit 150 may update the stored information and store the updated information in the storage unit 160.

Referring to FIG. 4A, when the user selects the event permission area storage menu 11c, an alert window 18 for informing that the event management area of the sink device 20 has been set and stored may be displayed as shown in FIG. 4B.

Referring to FIG. 5A, if the user selects an event permission area confirmation menu 11d, the event management area 19 of the sink device 20 may be displayed for a predetermined time as shown in FIG. 5B. Accordingly, the user can intuitively recognize and is confirm the event management area 19 of the sink device 20.

The event management area 19 can be confirmed not only in the source device 10 but also in the sink device 20. Referring to FIG. 6A, menus for the user to confirm the event management area on the current screen 21 that is displayed on the sink device 20 may be provided in the form of a UI (User Interface).

If the user selects an event permission area confirmation menu 21a, the event management area 29 of the sink device 20 may be displayed for a predetermined time as shown in FIG. 6B. Accordingly, the user can intuitively recognize and confirm the event management area 19 even in the sink device 20.

As shown in FIG. 6B, the event management area 29 may be constantly displayed to facilitate the user's recognition without a user's menu selection of an event management area.

If an event occurs in the sink device 20, the event is input to the source device 10 through the communication unit 180. For example, the event may include at least one of a touch event, a mouse event, a key event, and a keyboard event.

The communication unit 180 includes a platform that supports WLAN communication with the sink device 20.

For example, when the source device 10 and the sink device 20 perform Wi-Fi direct communication, the communication unit 180 may include a Wi-Fi P2P/TDLS (Peer-to-Peer/Tunneled Direct Link Setup) block for connecting a Wi-Fi device, an IP block and a TCP (Transmission Control Protocol) block that take charge of an IP and transfer protocol of the Wi-Fi device, a UIBC (User Input Back Channel) capsulation block for transferring a user event, a generic block or BLUETOOTH that takes charge of a general user event, and a HIDC (Human Interface Device Class) block that takes charge of an event having a path, such as, a Universal Serial Bus (USB). The communication unit 180 may be configured as needed, and may follow a communication standard.

In the related art, if an event is transferred from the sink device 20, a UIBC event, such as a mouse or a key, is transferred to the generic block through the UIBC block to be analyzed, and a UIBC event, such as BLUETOOTH, a touch having a path, such as a USB, a mouse, or a keyboard, is transferred to the HIDC block to be analyzed, and then is immediately output to the event processing unit.

In the present disclosure, however, only an effective event is output to the event processing unit 110 through the determination unit 170. Specifically, the determination unit 170 determines whether the event that is transferred from the sink device 20 has occurred in the event management area, and only in the case where the event has occurred in the event management area, the event is output to the event processing unit 110.

The determination unit 170 may determine whether the event has occurred in the event management area through comparison of the position information of the event management area that is stored in the storage unit 160 with position information where the event that is transferred from the sink device 20 has occurred.

If the event has not occurred in the event management area as the result of the determination by the determination unit 170, the event is disregarded. By contrast, if the event has occurred in the event management area, the event is output to the event processing unit 110.

The event processing unit 110 processes the event that is received from the determination unit 170. The event that is processed by the event processing unit 110 may be provided to the user in the form of a UI (User Interface).

Figure 7:
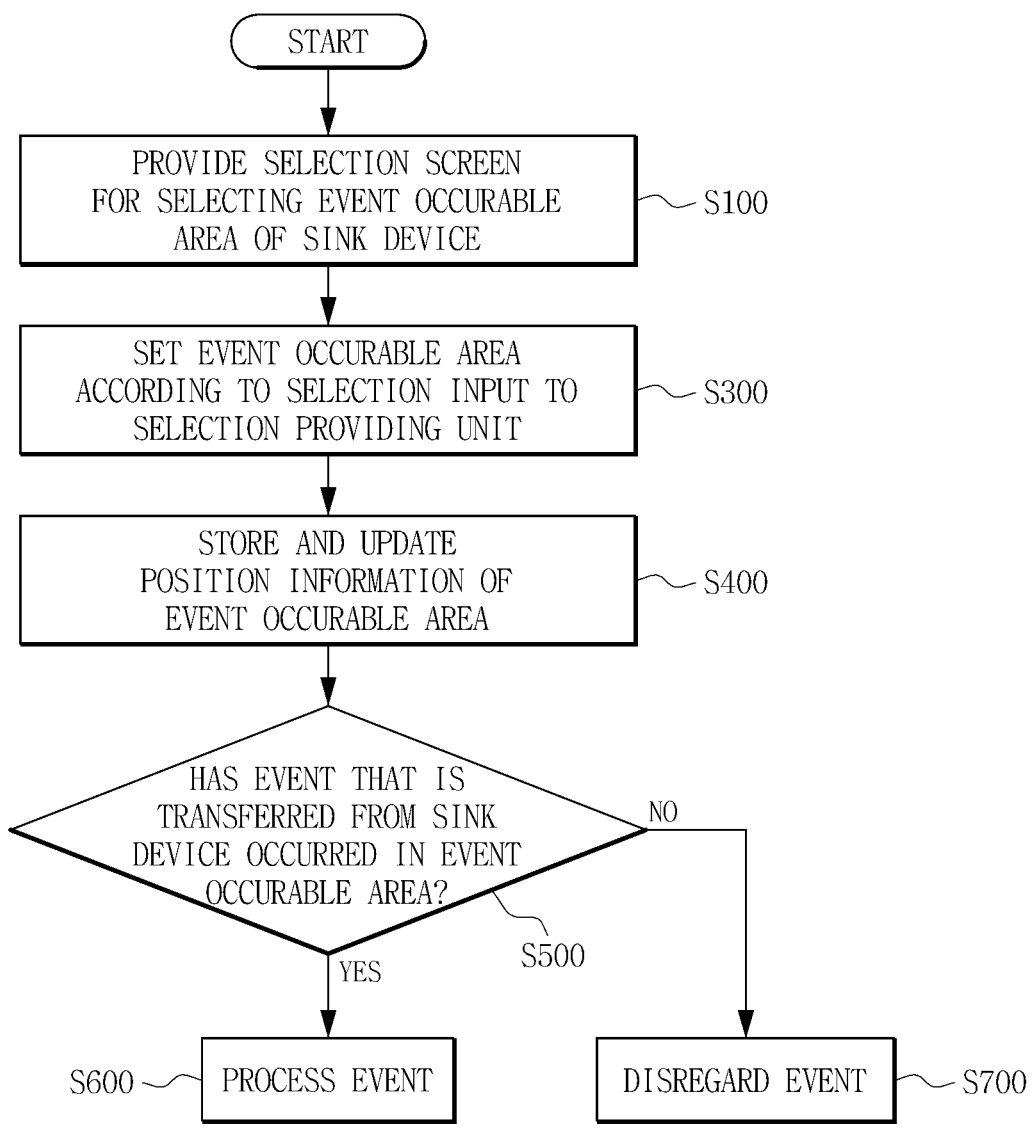
FIG. 7 is a flowchart illustrating a method for controlling an event occurring in the sink device through the source device according to exemplary embodiments.
Figure 8:
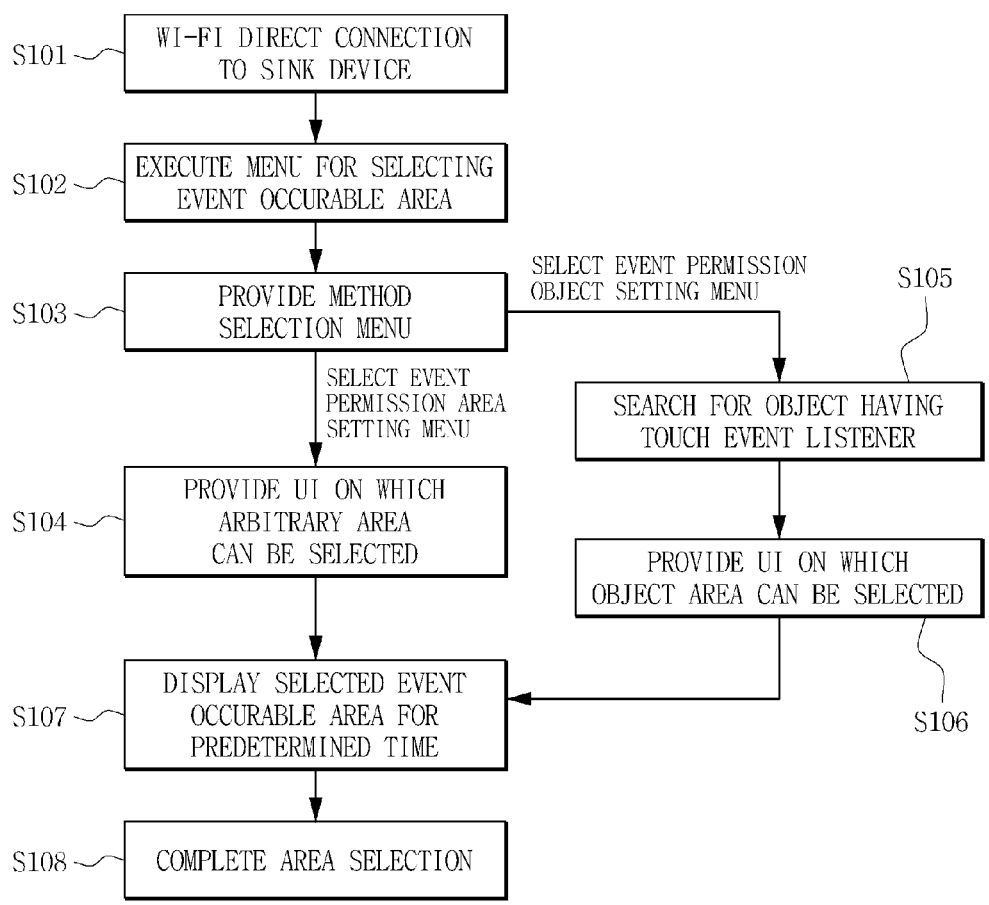
FIG. 8, FIG. 9 and FIG. 10 are flowcharts illustrating a method for controlling an event occurring in the sink device through the source device according to exemplary embodiments.
Figure 9:
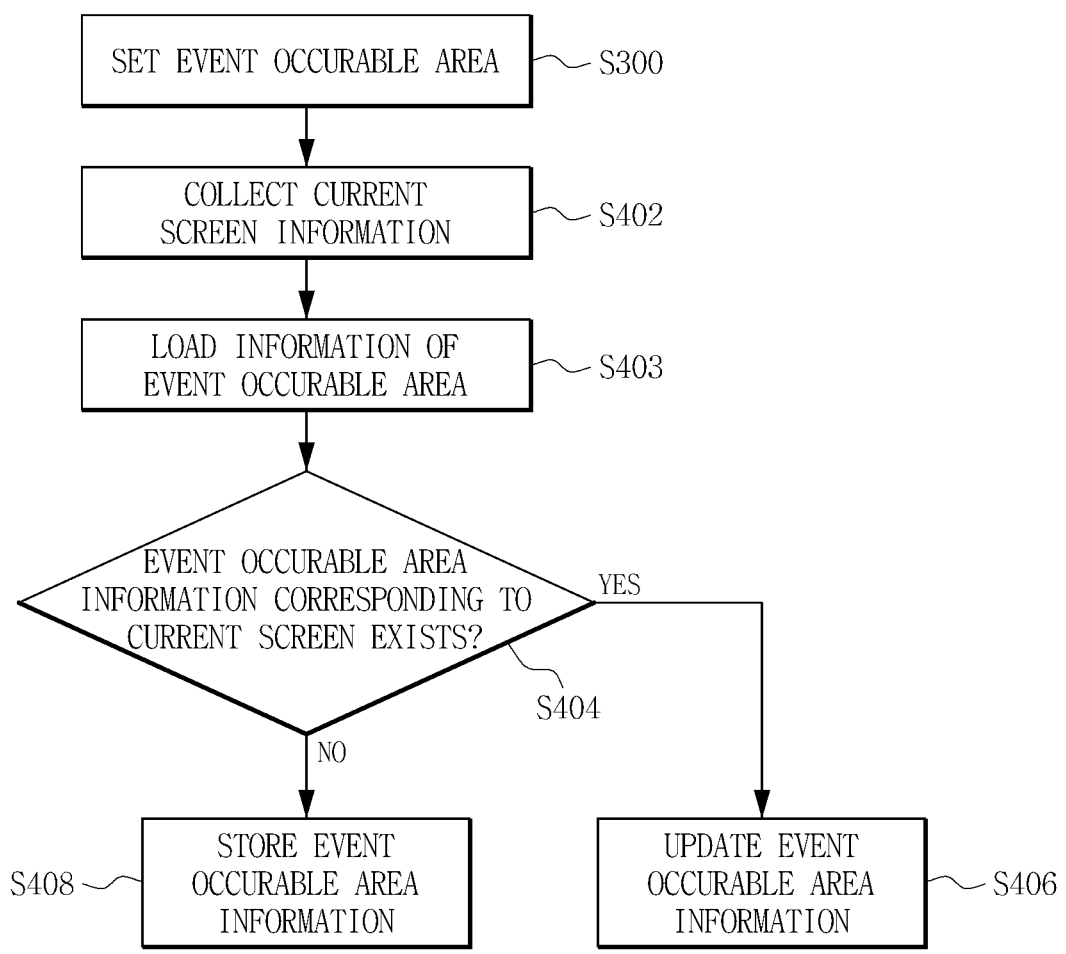
Figure 10:
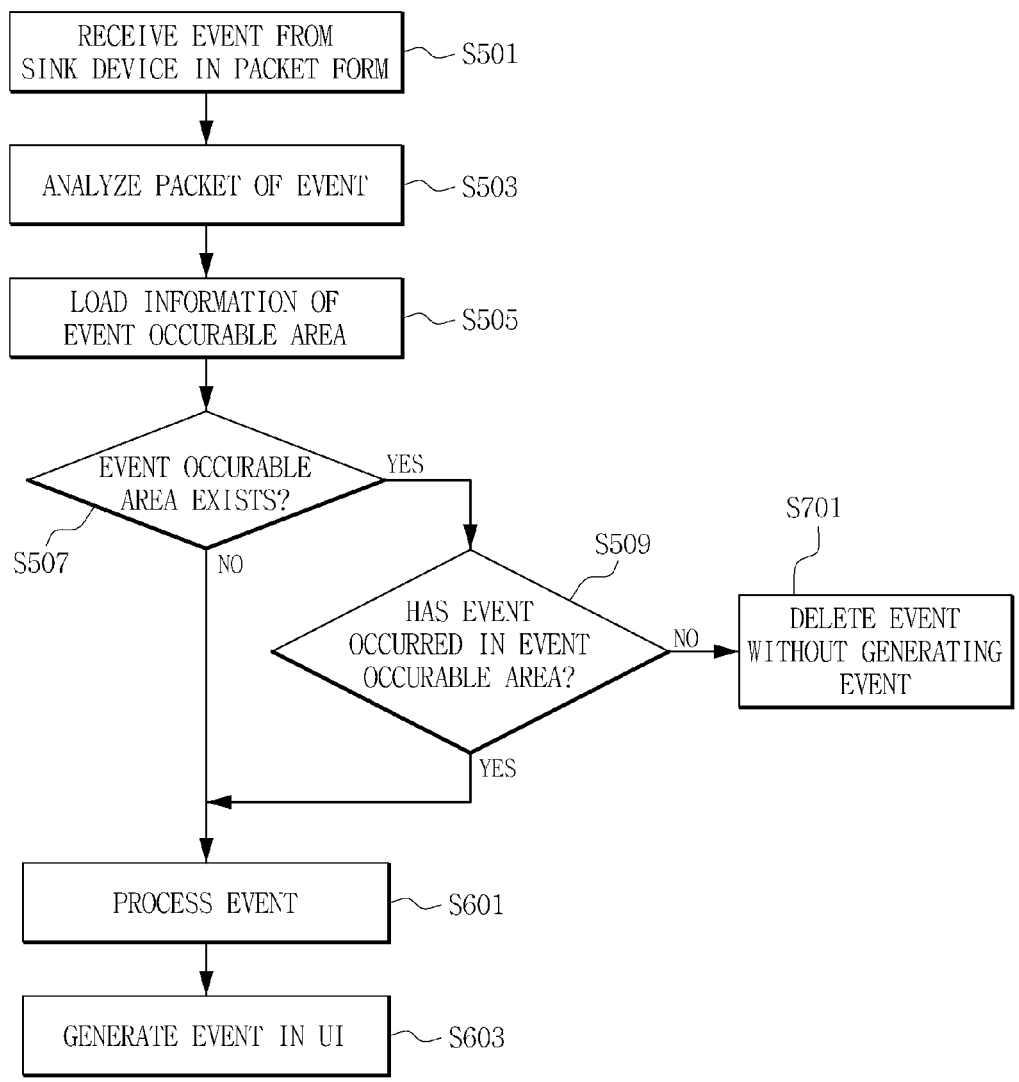

FIG. 7 is a flowchart illustrating a method for controlling an event occurring in is the sink device through the source device according to exemplary embodiments. FIG. 8, FIG. 9 and FIG. 10 are flowcharts illustrating a method for controlling an event occurring in the sink device through the source device according to exemplary embodiments.

In exemplary embodiments, the method for controlling the sink device may be performed through substantially the same configuration as the source device 10 and the sink device 20 of the WLAN system 1 of FIG. 1. Accordingly, the same reference numerals are used for the same constituent elements as the source device 10 and the sink device 20 of FIG. 1, and duplicate explanation thereof will be omitted.

Referring to FIG. 7, in the method for controlling the sink device according to exemplary embodiments, the source device 10 provides a selection screen for selecting the event management area of the sink device 20 (S100).

Referring to FIG. 8, the operation S100 will be described in detail. The source device 10 and the sink device 20 are connected to each other to perform Wi-Fi direct communication (S101), and if a menu for selecting the event management area is executed through the user selection (S102), selection menus of a method for selecting the event management area are provided in the form of a UI (User Interface) (S103).

For example, if the user selects the event permission area setting menu, a selection screen, on which an arbitrary area can be selected, may be displayed to overlap the current screen that is displayed by the source device 10 (S104). The selection screen may display a selection view, which can be moved, expanded, or contracted according to a user selection, on the current screen for a background (see FIG. 2A, FIG. 2B, FIG. 2C and FIG. 2D).

If the user selects the event permission object setting menu, an object having a touch event listener that exists on the current screen is searched for (S105). If the event does not is include the listener as the result of the search, no separate process is performed, while if the event includes the listener, the selection screen is provided with the current screen for a background (S106). The selection screen provides a selection view, on which areas corresponding to respective objects can be selected, with the current screen for a background (see FIG. 3A, FIG. 3B, FIG. 3C and FIG. 3D).

If the user selects an arbitrary area or an object area on the selection screen, the source device 10 may display the selected event management area for a predetermined time (S107). Through this, the selection of the event management area of the sink device 20 is completed (S108).

As seen in FIG. 7, the event management area is set according to the selection (S300), and position information of the set event management area may be stored and updated (S400).

Referring to FIG. 9, the operations S300 and S400 will be described in detail. If the event management area is set, the source device 10 collects information of the current screen that is displayed by the source device 10 (S402). The information of the current screen may be an application for dividing the screen, activity, view information, area coordinates, or the like.

Information of the stored event management area is loaded (S403), and it is confirmed whether information of the event management area that corresponds to the current screen exists (S404) through comparison of the information of the event management area with the collected current screen. If the information of the event management area that corresponds to the current screen has already been stored, the information is updated (S406), while if the information of the event management area has not been stored, new information is stored (S408).

Referring to FIG. 7, thereafter, when the event is transferred from the sink device 20, it is determined whether the event has occurred in the event management area (S500), and the event is processed only in the case where the event has occurred in the event management area (S600). By contrast, if the event has not occurred in the event management area, the event is disregarded (S700).

Referring to FIG. 10, the operations S500 to S700 will be described in detail. If the event is received from the sink device 20 in the form of a packet (S501), the packet of the event is analyzed (S503). The source device 10 may change the event to an event value that corresponds to its own device.

This is because the source device 10 and the sink device 20 may differ from each other in use environment, such as, a size, ratio, and resolution of the screen. When the source device 10 and the sink device 20 have the same use environment, the event that is received from the sink device 20 could be applied to the source device 10 as it is.

In order to determine whether the event is effective, the information of the event management area is loaded (S505), and it is determined whether the event management area, which is pre-designated by the user, exists (S507). If the event management area, which is pre-designated by the user, does not exist, the event is immediately processed (S601), and the UI generates the event (S603). However, if the pre-designated event management area does not exist, the event may be set to be disregarded.

When the event management area pre-designated by the user exists, it is determined whether the event has occurred in the event management area through comparison of the position information of the stored event management area with the position information where the event, transferred from the sink device 20, has occurred (S509).

If the event has not occurred in the event management area, the event is not is generated and is deleted (S701) or not transferred from the sink device 20 to the source device 10. In exemplary embodiments, the event is not generated and is disregarded (S701). The sink device 20 may have other event managers associated with the area outside the event management area, and the event may be handled by the other event managers, as necessary. When the event has occurred in the event management area, the event is processed (S601) and the UI generates the event (S603).

According to the WLAN system 1, the source device 10 and the method for controlling the sink device in the WLAN system, the source device 10 determines and processes only the event that has occurred in the event management area that is pre-designated by the user, among the event transferred from the sink device 20, as the effective event. Accordingly, the event that violates the security policy of the source device or that runs contrary to the display sharing intentions is intercepted, and the sink device can be efficiently controlled.

Further, since the unnecessary event is deleted and the source device 10 does not process the event, unnecessary resource waste and congestion with the event that occurs in the source device 10 can be prevented. When the content, such as a game, simultaneously uses the source device 10 and the sink device 20, the role division between the two devices is accurate, and malfunction can be prevented. Further, the load of the source device can be reduced.

Figure 11:
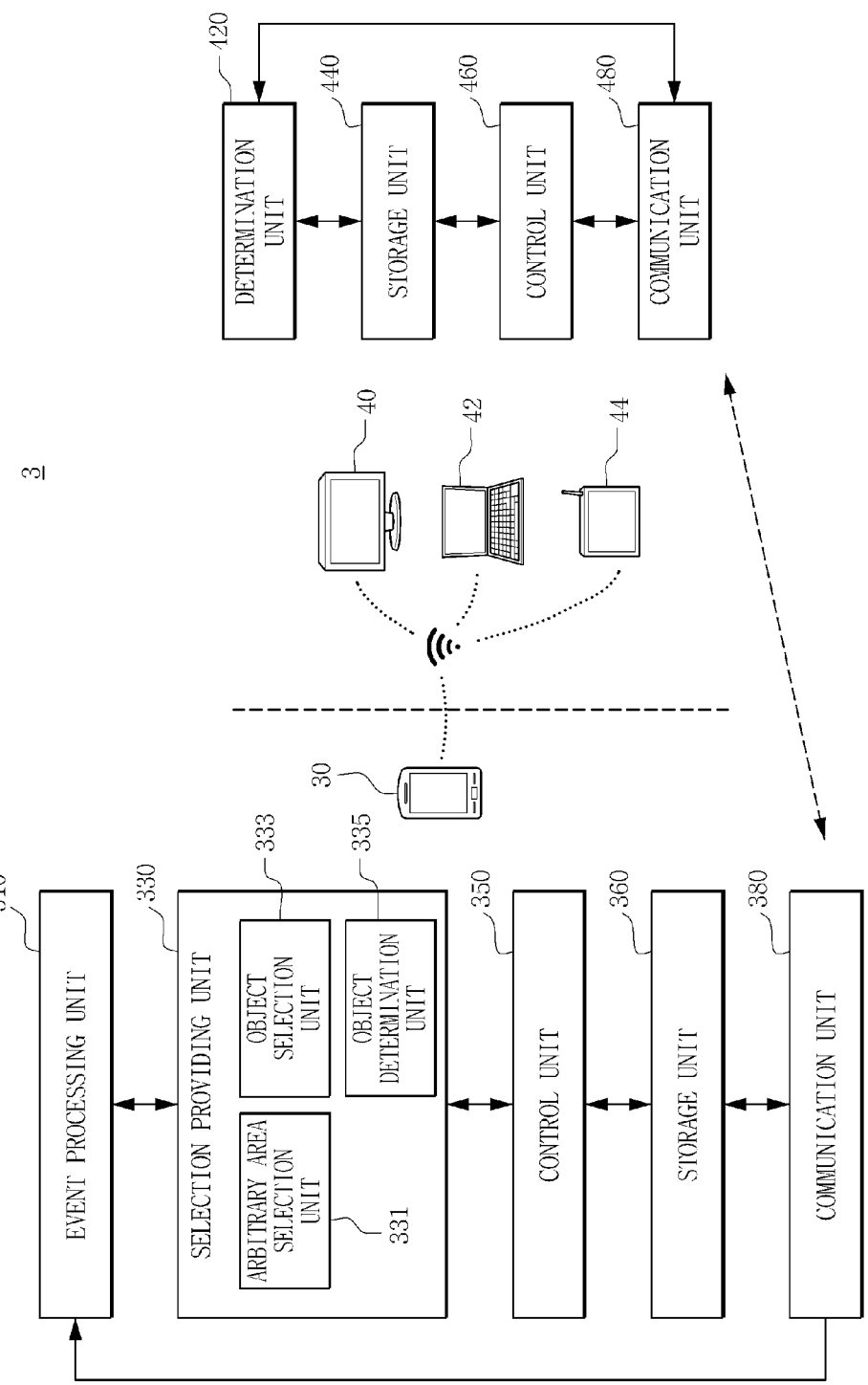
FIG. 11 is a block diagram of a WLAN system according to exemplary embodiments of the present disclosure.

FIG. 11 is a block diagram of a WLAN system according to exemplary embodiments of the present disclosure.

The WLAN system 3 according to exemplary embodiments is substantially the same as the WLAN system 1 of FIG. 1 except that the sink device 40 determines effectiveness of the event. Accordingly, duplicate explanation thereof will be omitted.

Referring to FIG. 11, a WLAN system 3 according to the present disclosure may is include a source device 30, and at least one sink device 40, 42, and 44 that is positioned to be spaced apart from the source device 30. Hereinafter, for convenience in explanation, one sink device 40 is representatively described.

The source device 30 includes an event processing unit 310, a selection providing unit 330, and a control unit 350. The source device 30 may include a storage unit 360 and a communication unit 380.

The selection providing unit 330 provides a selection screen for selecting the event management area of the sink device 40. The control unit 350 sets the event management area according to the user selection that is provided to the selection providing unit 330. The control unit 350 may store information of the event management area in the storage unit 360.

The communication unit 380 includes a platform that communicates with the sink device 40, and the event processing unit 310 processes the event that is transferred from the sink device 40 and provides the processed event to the user in the form of a UI (User Interface).

The sink device 40 includes a communication unit 480, a control unit 460, a storage unit 440, and a determination unit 420.

The communication unit 480 includes a platform that supports WLAN communication with the source device 30. The information of the event management area that is set by the source device 30 is transferred to the sink device 40 through the communication unit 480. The information of the event management area may be transferred in the form of a packet.

The control unit 460 sets the event management area through analysis of the information of the event management area. The control unit 460 stores and updates the information of the event management area in the storage unit 440.

In the sink device 20, the user may confirm the event management area through is selection of an event permission area confirmation menu 21a (see FIG. 6A and FIG. 6B).

In the related art, if the event occurs in the sink device 40, all of the occurring events are immediately transferred to the source device 30. However, according to the present disclosure, only effective an event is transferred to the source device 30 through the determination unit 420.

The determination unit 420 determines whether the event occurring in the sink device 40 has occurred in the event management area, and outputs the event to the communication unit 480 to transfer the event to the source device 30 only in the case where the event has occurred in the event management area.

In exemplary embodiments of the present disclosure, the WLAN system (not illustrated) may include the source device 10 of FIG. 1 and the sink device 40 of FIG. 11. In this case, one device could determine the effective event according to the use environment or the user selection.

Figure 12:
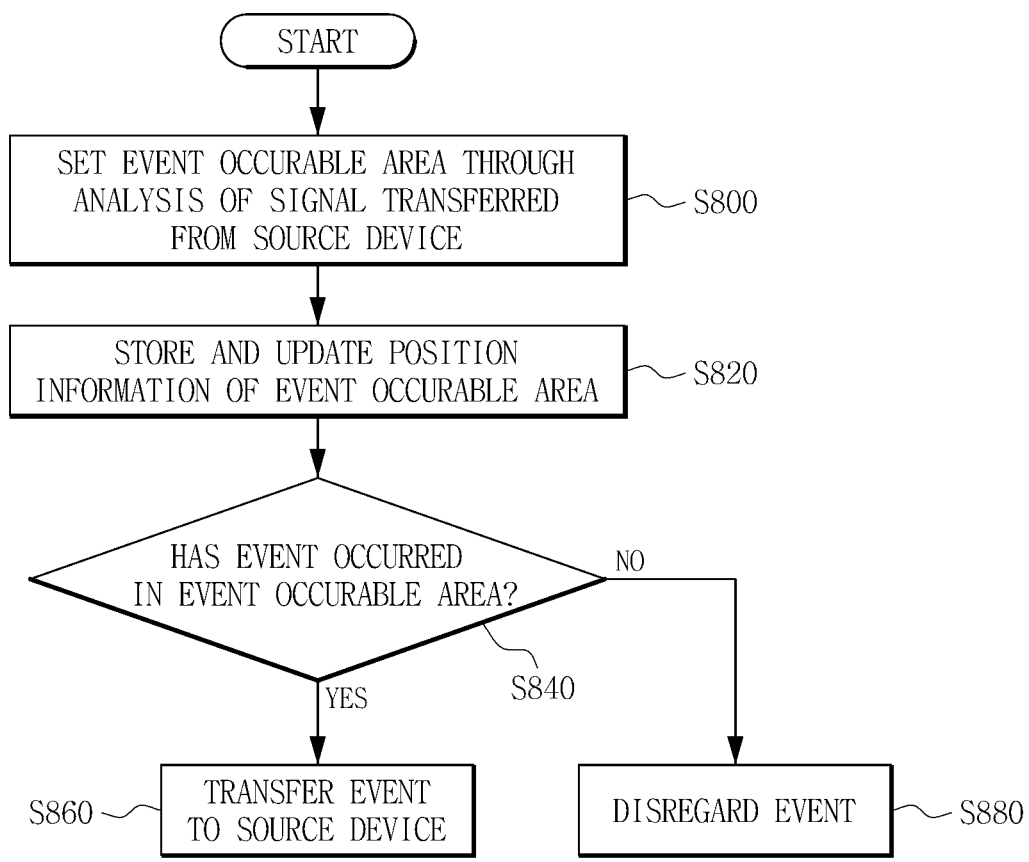
FIG. 12 is a flowchart illustrating a method for controlling an occurring event through the sink device according to exemplary embodiments.
Figure 13:
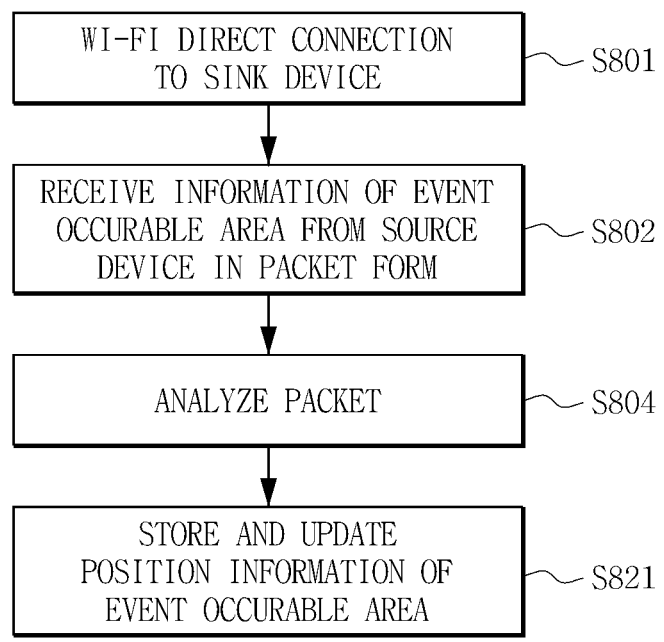
FIG. 13 and FIG. 14 are flowcharts illustrating a method for controlling an occurring event through the sink device according to exemplary embodiments.
Figure 14:
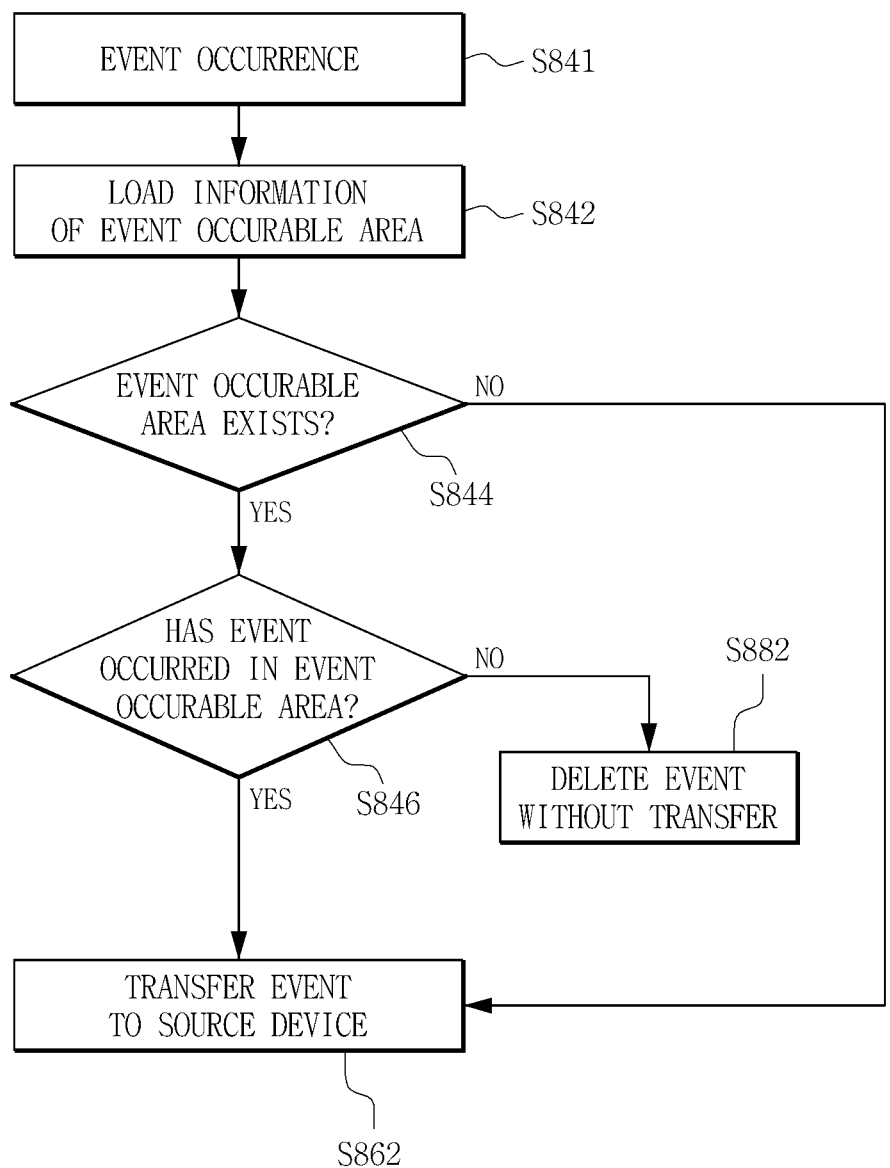

FIG. 12 is a flowchart illustrating a method for controlling an occurring event through the sink device of FIG. 11. FIG. 13 and FIG. 14 are flowcharts illustrating the operations of FIG. 12 in detail.

In exemplary embodiments, the method for controlling the sink device may be performed through substantially the same configuration as the source device 30 and the sink device 40 of the WLAN system 3 of FIG. 11. Accordingly, the same reference numerals are used for the same constituent elements as the source device 30 and the sink device 40 of FIG. 11, and duplicate explanation thereof will be omitted.

Referring to FIG. 11, in the method for controlling the sink device according to exemplary embodiments, the sink device 40 sets the event management area through analysis of is a signal that is transferred from the source device 30 (S800). Further, the sink device 40 can store and update the position information of the set event management area (S820).

Referring to FIG. 13, the operations S800 and S820 will be described in detail. The source device 30 and the sink device 40 are connected to each other to perform Wi-Fi direct communication (S801), and if the information of the event management area is received from the source device 30 in the form of a packet (S802), the packet is analyzed (S804).

The sink device 20 may change the information of the event management area to the information that corresponds to its own device. This is because the source device 30 and the sink device 40 may differ from each other in use environment, such as a size, ratio, and resolution of the screen. When the source device 30 and the sink device 40 have the same use environment, the information on the event management area that is received from the source device 30 could be applied to the sink device 40 as it is.

Then, based on the analyzed information, the position information of the set event management area is stored and updated (S821).

Thereafter, if the event is transferred from the sink device 40, it is determined whether the event has occurred in the event management area (S840), and the event is transferred to the source device 30 only when the event has occurred in the event management area (S860). When the event has not occurred in the event management area, the event is disregarded (S880).

Referring to FIG. 14, the operations S840 to S880 will be described in detail. If an event occurs in the sink device 40, information of the event management area is loaded (S842), and it is determined whether a pre-designated event management area exists (S844).

If the event management area that is pre-designated by the user does not exist, the event is immediately transferred to the source device 30 (S862). However, if the pre-designated is event management area does not exist as needed, the event may be set to be disregarded.

When the pre-designated event management area exists, it is determined whether the event has occurred in the event management area through comparison of the position information of the stored event management area with the position information where the event has occurred (S846).

If the event has not occurred in the event management area, the event is not transferred, but is deleted (S882). When the event has occurred in the event management area, the event is transferred to the source device 30 (S862).

According to the WLAN system 3, the sink device 40 and the method for controlling the sink device according to exemplary embodiments, the sink device 40 determines events that have occurred in the pre-designated event management area as effective events, and transfers the effective events to the source device 30. Accordingly, an event that violates the security policy of the source device or runs contrary to the display sharing intentions is intercepted, and thus the sink device can be efficiently controlled.

Further, since the sink device 40 deletes the unnecessary event, the load of the source device 10 can be reduced. Further, even in the sink device 40, the user can clearly recognize the controllable operations, and thus the sink device 40 can be conveniently used.

Although the present invention has been described with reference to the embodiments shown in the drawings, these embodiments are illustrative only and those skilled in the art will appreciate that various modifications, additions and substitutions are possible, without departing from the technical protection scope of the present invention. Therefore, the true technical protection scope of the present invention should be defined by the technical spirit of the appended claims.

What is claimed is:

1. A source device to transmit media data, the source device comprising:
    an event processing unit configured to process an event that occurs in a remote sink device communicating through a network;
    a control unit configured to set an event management area of the sink device, wherein the event management area is an area on a screen of the sink device pre-selected by a user to be effective for transmitting event requests, wherein the pre-selected area can be moved, expanded and contracted according to the user; and a determination unit configured to determine whether the event transferred from the sink device has occurred in the event management area and configured to output the event to the event processing unit when the event has occurred in the event management area.

2. The source device of claim 1, wherein the network comprises a Wireless Local Area Network (WLAN).

3. The source device of claim 1, further comprising a storage unit configured to store sink device information, event management area information and event information.

4. The source device of claim 1, further comprising a selection providing unit configured to select the event management area.

5. The source device of claim 4, wherein the selection providing unit is further configured to overlap a current screen of the source device with a selection screen in which a selection is receivable.

6. The source device of claim 4, wherein the selection providing unit further comprises an object selection unit configured to select an object including an event listener.

7. The source device of claim 4, wherein the selection providing unit further comprises an object determination unit configured to search for an object including an event listener.

8. The source device of claim 4, wherein the selection providing unit further comprises an arbitrary area selection unit configured to display a selection screen to select the event management area.

9. The source device of claim 1, wherein the event management area comprises menus for one or more of event permission area setting, event permission object setting and event permission area storage.

10. A method utilizing a processor, the method comprising:
    processing an event that occurs in a remote sink device communicating through a network;
    setting an event management area of the sink device, wherein the event management area is an area on a screen of the sink device pre-selected to be effective for transmitting event requests, wherein the pre-selected area can be moved, expanded and contracted according to the user;
    determining, utilizing the processor, whether the event that is transferred from the sink device has occurred in the event management area; and
    outputting the event to the event processing unit when the event has occurred in the event management area.

11. The method of claim 10, wherein the network comprises a Wireless Local Area Network (WLAN).

12. The method of claim 10, further comprising storing sink device information, event management area information and event information.

13. The method of claim 10, further comprising selecting the event management area.

14. The method of claim 13, wherein the selecting further comprises overlapping a current screen of the source device with a selection screen in which a selection is receivable.

15. The method of claim 13, wherein the selecting further comprises selecting an object including an event listener.

16. The method of claim 13, wherein the selecting further comprises searching for an object including an event listener.

17. The method of claim 13, wherein the selecting further comprises a selection screen to select the event management area.

18. The method of claim 10, wherein the event management area comprises menus for one or more of event permission area setting, event permission object setting and event permission area storage.

19. A wireless local area network (WLAN), the WLAN comprising:
    a sink device; and
    a source device comprising:
    an event processing unit configured to process an event that occurs in a remote sink device communicating through a network,
    a control unit configured to set an event management area of the sink device, wherein the event management area is an area on a screen of the sink device pre-selected to be effective for transmitting event requests, wherein the pre-selected area can be moved, expanded and contracted according to the user, and
    a determination unit configured to determine whether the event transferred from the sink device has occurred in the event management area and configured to output the event to the event processing unit when the event has occurred in the event management area.

20. The WLAN of claim 19, wherein the determination unit is further configured to output the event to the event processing unit only when the event has occurred in the event management area.

* * * * *